3,158,002
OPERATION OF A THERMAL POWER PLANT
WITH NUCLEAR REACTOR
Werner Spillmann, Zurich, Switzerland, assignor to Escher Wyss Aktiengesellschaft, Zurich, Switzerland, a corporation of Switzerland
Filed Dec. 8, 1961, Ser. No. 157,949
Claims priority, application Switzerland, Dec. 22, 1960, 14,292/60
4 Claims. (Cl. 60—59)

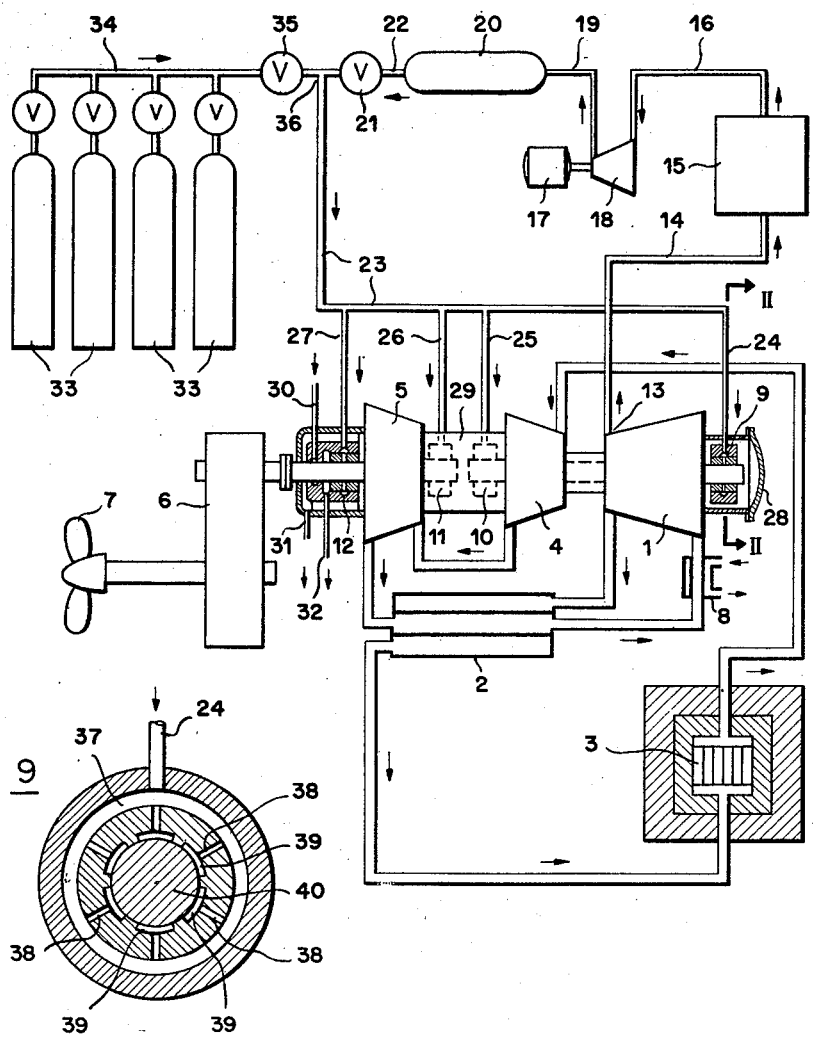

Thermal power plants are known, in which a gaseous working medium in circulation is raised to an elevated pressure in a compressor, is heated in a nuclear reactor and then is expanded in a turbine while doing work. In such thermal power plants, it is sometimes possible for small quantities of radioactive substances from the nuclear reactor to find their way into the working circuit, or for constituents of the working gas itself to be converted into radioactive substances under the effect of the neutron radiation. A known step for preventing an increase of radioactive substances in the working circuit is to remove continuously a certain quantity of working gas, to free it from radioactive impurities in a purifying plant, and then to return it to the working circuit.

This invention now relates to a process in the operation of a thermal power plant with circulation of a gaseous working medium, which is raised to an elevated pressure in a compressor, is heated in a nuclear reactor, and is expanded in a turbine while doing work, and in which furthermore an auxiliary circuit is provided, wherein continuously part of the working medium is removed from the working circuit, is freed from any radioactive impurities contained in it and is thereupon returned to the working circuit. The process according to the invention consists in that the gas freed from the aforesaid impurities is supplied to at least one of the bearings of the turbomachines, i.e. of the turbine or compressor, as bearing gas and lubricant, before being returned to the working circuit. Simplification of operation is thereby obtained. The invention further relates to a thermal power plant for carrying out this process.

The drawing illustrates in simplified form, as example, a thermal power plant for carrying out the process according to the invention. The process will also be explained by way of example with reference to this illustration.

FIG. 1 shows a diagram of a thermal power plant for propelling a ship, and FIG. 2 is a cross-section through a bearing of the turbomachines on the line II—II of FIG. 1.

The working circuit of the thermal power plant passes successively through a compressor 1, the high-pressure side of a heat exchanger 2, a nuclear reactor 3, a high-pressure turbine 4 and a low-pressure turbine 5, which drives a ship's propeller 7 by means of gearing 6, the low-pressure side of the heat exchanger 2 and a cooler 8, and finally arrives again at the suction side of the compressor 1. The compressed working gas, for example helium, absorbs heat in the nuclear reactor 3 and is then expanded in the turbines 4 and 5 while doing work. The expanded gas first gives off heat to the compressed gas in the heat exchanger 2 before being cooled in the cooler 8 to the suction temperature of the compressor 1. Bearings 9, 10, 11 and 12 are provided for the mounting of the turbomachines 1, 4, 5.

An auxiliary circuit is also connected to the working circuit. This auxiliary circuit branches off at the high-pressure end of the compressor 1 at a point 13, and passes successively through a pipe-line 14, a purifying plant 15, a pipe-line 16, an auxiliary compressor 18 driven by a motor 17, a pipe-line 19, an accumulator 20, a pipe-line 22 provided with a valve 21, a pipe-line 23, then through different branch pipe-lines 24, 25, 26, 27, leading to the bearings 9, 10, 11, 12, and finally through the bearing gaps of these bearings.

Part of the gaseous working medium is withdrawn continuously from the working circuit through the pipe-line 14. The gas withdrawn from the working circuit is purified in the purifying plant 15 from any radioactive impurities contained in it, such as for example radioactive bromine, krypton, xenon or iodine. The purifying plant 15 may contain known means, such as filters, absorbers, adsorbers and refrigerants, for separating the aforesaid impurities from the working gas. The purified gas leaving the purifying plant 15 by the pipe-line 16 is raised to a higher pressure by the auxiliary compressor 8, which is particularly advantageous if the bearings of the turbomachines are constructed as aerostatic bearings, that is to say, if the shaft is carried by pressure cushions formed by the gas.

The gas of the auxiliary circuit entering the bearing gaps of the bearings 9, 10, 11, 12 then passes over into the working circuit. The bearing 9 is entirely enclosed on the side of the shaft end by a housing 28 connected gas-tight with the housing of the compressor 1, so that the gas escaping from the bearing gap cannot pass into the open air. The exit side of the bearing gap is on the contrary in communication with the interior of the compressor housing, that is to say with the working circuit. In the case of the bearings 10 and 11, a housing 29 between the high-pressure turbine 4 and the low-pressure turbine 5 prevents the escape of gas into the open air. In the bearing 12, a liquid seal is provided on the side on which the turbine shaft passes to the outside for delivering useful power. The sealing liquid is introduced through a pipe-line 30. The liquid flowing outwardly from the bearing gap is drawn off through a connection 31. Gas and liquid are discharged between the gas bearing and liquid seal through a pipe-line 32. The two media are then separated from each other in known manner by means not shown, and are re-used.

For covering any leakage losses still occurring in the working circuit, a battery of compressed gas cylinders 33 is provided, which contain working gas and from which this working gas can be fed to a point 36 in the auxiliary circuit through a pipe-line 34 with valve 35.

The bearings 9, 10, 11, 12 are constructed as aerostatic bearings. As shown in FIG. 2 for bearing 9, the purified gas of the auxiliary circuit passes from the pipe-line 24 first into an annular space 37 and thence via throttling points 38 into individual chambers 39 distributed over the bearing periphery. The compressor shaft is denoted by 40. In the chambers 39, the gas forms pressure cushions which carry the shaft 40. The gas from the chambers 39 passes through the bearing gap in the axial direction and then mixes with the gas circulating in the working circuit.

In the plant described, the auxiliary circuit serves simultaneously for freeing the working gas from radioactive impurities and for supplying lubricant for the bearings. This thus results in a constructional simplification of operation, and also in the advantage that the bearings are supplied with purified gas only.

What is claimed is:

1. In the operation of a thermal power plant having turbomachines with circulation of a gaseous working medium, which is raised to an elevated pressure, is heated by heat generated in a nuclear reactor, then expanded while doing work, and is finally cooled and recompressed to said elevated pressure, a process comprising continuously withdrawing a medium part from the circulating working medium; purifying said medium part from any radioactive impurities contained therein; using the so-purified medium as bearing gas and lubricant for the turbomachines of the thermal power plant; and then readmixing the said gas with the circulating working medium.

2. In a thermal power plant operating with a gaseous working medium comprising turbomachines having gas-lubricated bearing means, for compression and expansion of said working medium; a nuclear reactor having means for the transfer of heat generated therein to the working medium; cooling means; and means defining a circuit for said gaseous working medium, leading in series through said turbomachine for compression, then through said reactor heat transfer means, then through said turbomachine for expansion, then through said cooling means, and then again through said turbomachine for compression: means for purifying gaseous medium from radioactive impurities contained therein; and flow connections branching off from said working medium circuit so as to allow part of the circulating working medium to flow through said purifying means, then through said turbomachine bearing means so as to be used therein as bearing gas and lubricant, and then to return to the working medium circuit.

3. The combination defined in claim 2 in which the flow connections for said medium part comprise an auxiliary compressor interposed between said purifying means and said bearing means so as to raise the purified gas to a higher pressure before it is used as bearing gas and lubricant.

4. The combination defined in claim 2 in which the bearing is constructed as aerostatic bearing comprising an annular bearing member provided with gas cushions distributed over the periphery of said bearing member; and supply connections including throttling passages for the supply of the bearing gas to said cushions.

References Cited by the Examiner
UNITED STATES PATENTS

| | | | |
|---|---|---|---|
| 2,929,548 | 3/60 | Crooks et al. | 308—9 X |
| 3,041,134 | 6/62 | Weeks | 176—37 X |
| 3,043,763 | 7/62 | Spillmann | 60—70 |

OTHER REFERENCES

Atomics, September 1956, pages 309 to 314.

Proceedings of the Second United Nations International Conference on the Peaceful Uses of Atomic Energy, vol. 9, United Nations, Geneva, 1958, pages 69, 70, 311, 312, 313, 314, 315.

Nuclear Science Abstracts, vol. 14, No. 22, Nov. 30, 1960, Abstract 22982.

CARL D. QUARFORTH, *Primary Examiner.*

REUBEN EPSTEIN, *Examiner.*